US012772036B2

(12) United States Patent
Karlin et al.

(10) Patent No.: US 12,772,036 B2
(45) Date of Patent: Oct. 20, 2026

(54) SYSTEM AND METHOD FOR PERSISTENT ROAMING

(71) Applicant: Boost SubscriberCo L.L.C., Englewood, CO (US)

(72) Inventors: Kevin Lee Karlin, Aurora, CO (US); Xiaowen Robinson, Great Falls, VA (US); Sougata Saha, Aurora, CO (US); Alberto Lozada Cristobal, Littleton, CO (US); Arnold Foronda Agcaoili, Littleton, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 333 days.

(21) Appl. No.: 18/415,425

(22) Filed: Jan. 17, 2024

(65) Prior Publication Data

US 2025/0234179 A1 Jul. 17, 2025

(51) Int. Cl.
*H04W 8/08* (2009.01)
*H04W 48/02* (2009.01)

(52) U.S. Cl.
CPC ............ *H04W 8/08* (2013.01); *H04W 48/02* (2013.01)

(58) Field of Classification Search
CPC ................................ H04W 8/08; H04W 48/02
See application file for complete search history.

(56) References Cited

U.S. PATENT DOCUMENTS

| | | | | |
|---|---|---|---|---|
| 11,956,748 B2 * | 4/2024 | Hathiramani | ....... | H04W 36/305 |
| 2011/0189991 A1 * | 8/2011 | Krause | .................. | H04W 8/205 455/432.1 |
| 2015/0117213 A1 * | 4/2015 | Pinheiro | ............... | H04W 48/06 370/235 |
| 2016/0014632 A1 * | 1/2016 | Siow | .................. | H04N 21/2402 370/230 |

(Continued)

FOREIGN PATENT DOCUMENTS

CN 110300006 A * 10/2019 ......... H04L 41/0893

OTHER PUBLICATIONS

3GPP TSG RAN3 Meeting 106 Reno Nevada Nov. 18-22, 2019 (Year: 2019).*

(Continued)

*Primary Examiner* — Charles T Shedrick
(74) *Attorney, Agent, or Firm* — Seed Intellectual Property Law Group LLP

(57) ABSTRACT

Embodiments are directed towards systems and methods for instantiating persistent roaming for a mobile device. One such method includes: receiving, at a provisioning engineering tool for managing mobile device provisioning and a plurality of Tracking Area Code (TAC) restriction tables, a request to update a provisioning profile associated with a user account, the user account associated with at least one mobile device, by adding at least one of the plurality of TAC restriction tables to the provisioning profile associated with the user account, each of the plurality of TAC restriction tables including a list of cellular sites in a geographical area;

(Continued)

and restricting the mobile device associated with the user account from a home Mobile Network Operators (MNO) network when the mobile device associated with the user account is in the geographical area associated with the listed cellular sites of the TAC restriction table in the provisioning profile.

20 Claims, 9 Drawing Sheets

(56) References Cited

U.S. PATENT DOCUMENTS

| | | | | |
|---|---|---|---|---|
| 2016/0157147 | A1* | 6/2016 | Saghir | H04W 36/04 455/444 |
| 2017/0006469 | A1* | 1/2017 | Palanigounder | H04L 9/0841 |
| 2018/0199262 | A1* | 7/2018 | Kuge | H04W 12/06 |
| 2018/0249528 | A1* | 8/2018 | Kuge | H04W 60/00 |
| 2019/0200285 | A1* | 6/2019 | Velev | H04W 48/00 |
| 2020/0092795 | A1* | 3/2020 | Raval | H04L 63/101 |
| 2021/0058851 | A1* | 2/2021 | Hua | H04W 8/24 |
| 2021/0120621 | A1* | 4/2021 | Kwong | H04W 24/10 |
| 2021/0368342 | A1* | 11/2021 | Zhu | H04W 12/71 |
| 2022/0015013 | A1* | 1/2022 | Timson | H04L 63/10 |
| 2022/0225105 | A1* | 7/2022 | Balasubramanian | H04W 12/63 |
| 2022/0303846 | A1* | 9/2022 | Sharma | H04W 36/04 |
| 2024/0121699 | A1* | 4/2024 | Agcaoili | H04W 48/16 |
| 2024/0430782 | A1* | 12/2024 | Zaus | H04W 48/12 |

OTHER PUBLICATIONS

"3rd Generation Partnership Project; Technical Specification Group Radio Access Network; NG-RAN; Architecture description (Release 16," 3GPP TS 38.401 V16.8.0, Technical Specification, Dec. 2021, 79 pages.

* cited by examiner

SYSTEM AND METHOD FOR PERSISTENT ROAMING

BACKGROUND

As the use of smart phones and Internet of Things (IoT) devices has increased, so too has the desire for more reliable, fast, and continuous transmission of content. In an effort to improve the content transmission, networks continue to improve with faster speeds and increased bandwidth. The advent and implementation of advanced wireless technology has resulted in faster speeds and increased bandwidth. Thus, minimizing interruptions in the supporting networking infrastructure is important to providing a resilient and stable network with the desired end-to-end performance. It is with respect to these and other considerations that the embodiments described herein have been made.

In some types of cellular network systems, there may be issues with problematic service coverage. This may be due to the network service area being new or may be because of long-term issues such as geography or weather conditions. There is a continuing need to address these network service areas with problematic service coverage with some type of technological improvement that will overcome these service coverage shortfalls. Unfortunately, a full solution to these end user experience problems of dropped calls and other types of poor network coverage has yet to be produced. The present disclosure addresses this and other issues.

BRIEF SUMMARY

The present disclosure relates generally to telecommunication networks, more particularly, to a system and method for instantiating persistent roaming for a mobile device.

Briefly stated, one or more methods for instantiating persistent roaming for a mobile device are disclosed. Some such methods include: receiving, at a provisioning engineering tool for managing mobile device provisioning and a plurality of Tracking Area Code (TAC) restriction tables, a request to update a provisioning profile associated with a user account, the user account associated with at least one mobile device, by adding at least one of the plurality of TAC restriction tables to the provisioning profile associated with the user account, each of the plurality of TAC restriction tables including a list of cellular sites in a geographical area; restricting the mobile device associated with the user account from a home Mobile Network Operators (MNO) network when the mobile device associated with the user account is in the geographical area associated with the listed cellular sites of the TAC restriction table in the provisioning profile; and enabling the restricted mobile device associated with the user account to begin roaming on a third party Mobile Network Operators (MNO) network.

In some embodiments, the method for instantiating persistent roaming for a mobile device further includes determining that one or more of the mobile devices associated with user accounts are candidates for persistent roaming in one or more geographical areas, and adding the one or more of the mobile devices associated with user accounts to the TAC restriction table. In another aspect of some embodiments, the restricting of the mobile device associated with the user account from the home MNO network further includes: sending a payload of data to the UDR to force the mobile device associated with the user account to attempt a registration process that launches the updated provisioning profile with the TAC restriction table. In still another aspect of some embodiments, the restricting of the mobile device associated with the user account from the home MNO network further includes: forcing the mobile device associated with the user account, via the UDR, to attempt a registration process further comprises losing Network Registration. In yet another aspect of some embodiments, the provisioning engineering tool includes multiple TAC restriction tables. In some embodiments, each TAC restriction table contains up to 255 Tracking Area Codes.

In one or more embodiments of the method for instantiating persistent roaming for a mobile device, the TAC restriction table individually identifies a user by International Mobile Subscriber Identifier (IMSI). In another aspect of some embodiments, the method for persistent roaming to mitigate problematic home network coverage areas further includes: enabling the user to be queried to determine their current connectivity state. In still another aspect of some embodiments, the prohibited services include one or more of voice and data services. In yet another aspect of some embodiments, the restricting of the mobile device of the user from the home Mobile Network Operators (MNO) network further comprises rejecting a registration attempt of the mobile device of the user.

In other embodiments, one or more systems for instantiating persistent roaming for a mobile device are disclosed. The system includes a memory that stores computer-executable instructions; and a processor that executes the computer-executable instructions that cause the processor to: receiving, at a provisioning engineering tool for managing mobile device provisioning and a plurality of Tracking Area Code (TAC) restriction tables, a request to update a provisioning profile associated with a user account, the user account associated with at least one mobile device, by adding at least one of the plurality of TAC restriction tables to the provisioning profile associated with the user account, each of the plurality of TAC restriction tables including a list of cellular sites in a geographical area; restrict the mobile device associated with the user account from a home Mobile Network Operators (MNO) network when the mobile device associated with the user account is in the geographical area associated with the listed cellular sites of the TAC restriction table in the provisioning profile; and enable the restricted mobile device associated with the user account to begin roaming on a third party Mobile Network Operators (MNO) network.

In some embodiments of the system for instantiating persistent roaming for a mobile device, the system determines that one or more of the mobile devices associated with user accounts are candidates for persistent roaming in one or more geographical areas, and adds the one or more of the mobile devices associated with user accounts to the TAC restriction table. In another aspect of some embodiments, the restricting of the mobile device associated with the user account from the home MNO network further includes a payload of data being sent to the UDR to force the mobile device associated with the user account to attempt a registration process that launches the updated provisioning profile with the TAC restriction table. In still another aspect of some embodiments, the restricting of the mobile device associated with the user account from the home MNO network further includes the mobile device associated with the user account being forced, via the UDR, to attempt a registration process further comprises losing Network Registration. In yet another aspect of some embodiments, the provisioning engineering tool includes multiple TAC restriction tables. In one embodiment, each TAC restriction table contains up to 255 Tracking Area Codes.

In one or more embodiments of the instantiating persistent roaming for a mobile device, the TAC restriction table individually identifies a user by International Mobile Subscriber Identifier (IMSI). In another aspect of some embodiments, the system enables the user to be queried to determine their current connectivity state. In still another aspect of some embodiments, the prohibited services include one or more of voice and data services. In yet another aspect of some embodiments, the restricting of the mobile device of the user from the home Mobile Network Operators (MNO) network further comprises rejecting a registration attempt of the mobile device of the user.

Moreover, in still other embodiments, one or more non-transitory computer-readable storage mediums are disclosed. The one or more non-transitory computer-readable storage mediums have computer-executable instructions stored thereon that, when executed by a processor, cause the processor to: receiving, at a provisioning engineering tool for managing mobile device provisioning and a plurality of Tracking Area Code (TAC) restriction tables, a request to update a provisioning profile associated with a user account, the user account associated with at least one mobile device, by adding at least one of the plurality of TAC restriction tables to the provisioning profile associated with the user account, each of the plurality of TAC restriction tables including a list of cellular sites in a geographical area; and restrict the mobile device associated with the user account from a home Mobile Network Operators (MNO) network when the mobile device associated with the user account is in the geographical area associated with the listed cellular sites of the TAC restriction table in the provisioning profile.

In one or more embodiments of the system for instantiating persistent roaming for a mobile device, the non-transitory computer-readable storage medium includes further computer-executable instructions that, when executed by a processor, cause the processor to: enable the restricted mobile device of the user to begin roaming on a third party Mobile Network Operators (MNO) network.

In some embodiments of the system for non-transitory computer-readable storage medium for instantiating persistent roaming for a mobile device, the system determines that one or more of the mobile devices associated with user accounts are candidates for persistent roaming in one or more geographical areas, and adds the one or more of the mobile devices associated with user accounts to the TAC restriction table. In another aspect of some embodiments, the restricting of the mobile device associated with the user account from the home MNO network further includes a payload of data being sent to the UDR to force the mobile device associated with the user account to attempt a registration process that launches the updated provisioning profile with the TAC restriction table. In still another aspect of some embodiments, the restricting of the mobile device associated with the user account from the home MNO network further includes the mobile device associated with the user account being forced, via the UDR, to attempt a registration process further comprises losing Network Registration. In yet another aspect of some embodiments, the provisioning engineering tool includes multiple TAC restriction tables. In one embodiment, each TAC restriction table contains up to 255 Tracking Area Codes.

In one or more embodiments of non-transitory computer-readable storage medium instantiating persistent roaming for a mobile device, the TAC restriction table individually identifies a user by International Mobile Subscriber Identifier (IMSI). In another aspect of some embodiments, the system enables the user to be queried to determine their current connectivity state. In still another aspect of some embodiments, the prohibited services include one or more of voice and data services. In yet another aspect of some embodiments, the restricting of the mobile device of the user from the home Mobile Network Operators (MNO) network further comprises rejecting a registration attempt of the mobile device of the user.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the disclosed invention, reference will be made to the following Detailed Description, which is to be read in association with the accompanying drawings.

DETAILED DESCRIPTION

Figure 1:
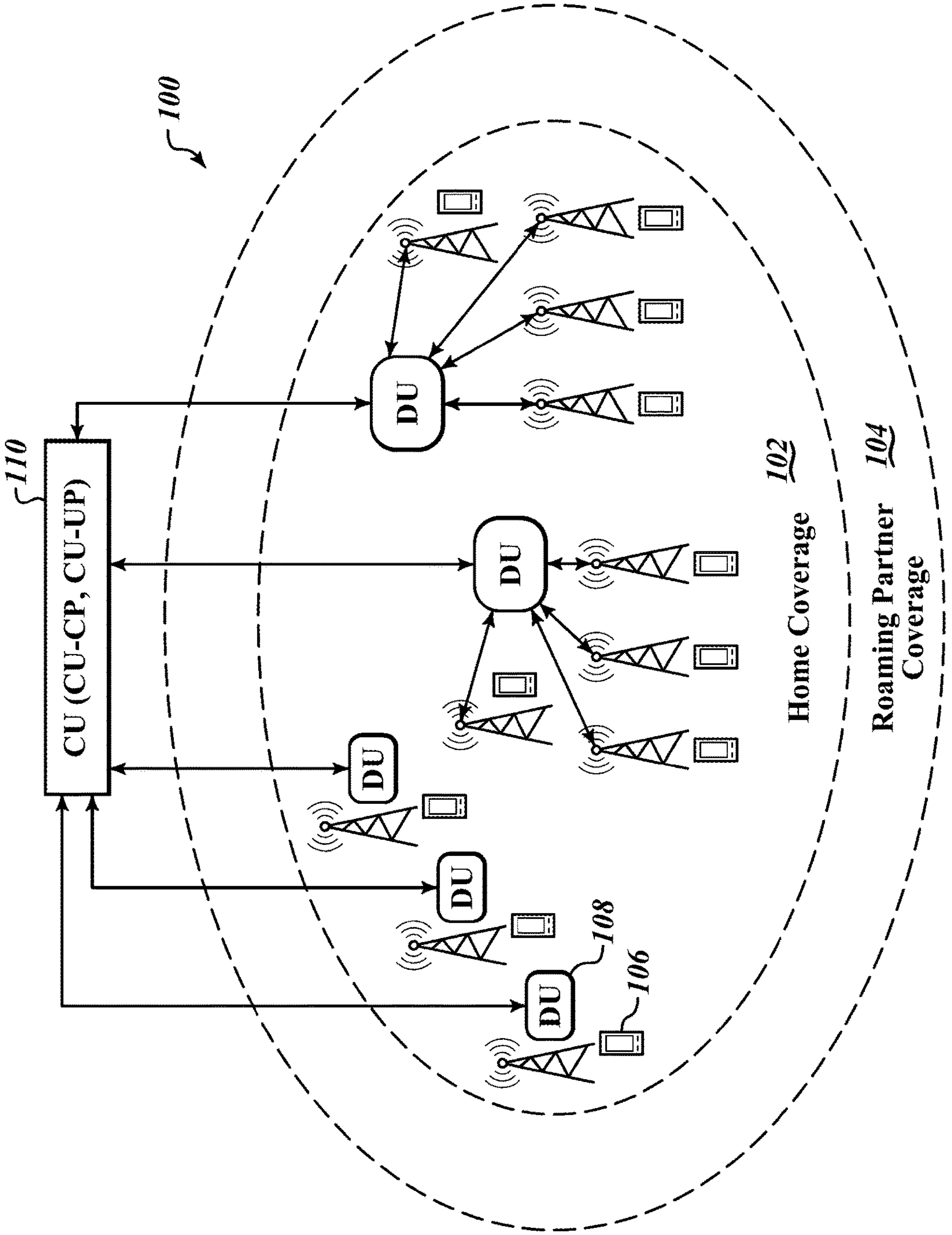
FIG. 1 illustrates a context diagram of an environment in which a system for persistent roaming to mitigate problematic home network coverage areas may be implemented in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, and the like. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Advanced cellular networks provide a broad range of wireless services delivered to the end user across multiple access platforms and multi-layer networks. For example, 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible, and virtual RAN with interfaces creating additional data access points. 5G network functions may be completely software-based and designed as cloud-native, meaning that they're agnostic to the underlying cloud infrastructure, allowing higher deployment agility and flexibility. With the advent of 5G, industry experts defined how the 5G Core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations. Future network architectures, such as 6G and others, are expected to utilize many of these features and functionalities.

Multi-Access Edge Computing (MEC) is an important element of 5G architecture. MEC is an evolution in telecommunications that brings the applications from centralized data centers to the network edge, and therefore closer to the end users and their devices. This essentially creates a shortcut in content delivery between the user and host, and the long network path that once separated them. This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which leverages IT development principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open-source development, ultimately to ease the deployment of new features and technology with scale. The O-RAN ALLIANCE objective is to allow multi-vendor deployment with off-the-shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises a set of radio base stations (each known as Next Generation Node B (gNB)) connected to the 5G Core (5GC) and to each other. The gNB incorporates three main functional modules: the Centralized Unit (CU), the distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021 December). Each network function (NF) is formed by a combination of small pieces of software code called microservices. Future network architectures, such as 6G and others, are expected to utilize many of these technological improvements, plus additional advancements.

FIG. 1 illustrates a context diagram of an environment in which a system for persistent roaming to mitigate problematic home network coverage areas may be implemented in accordance with embodiments described herein. A given area 100 will mostly be covered by two or more mobile network operators' wireless networks. Generally, mobile network operators have some roaming agreements that allow users to roam from home network to partner network under certain conditions, shown in FIG. 1 as home coverage area 102 and roaming partner coverage area 104. Operators may configure the mobile user's device, referred to herein as user equipment (UE), such as UE 106, with priority and a designated roaming partner network that is used in the roaming partner network coverage area 104. If a UE (e.g., UE 106) cannot find the home network coverage area 102, the UE will be transferred to a partner roaming network in the roaming partner coverage area 104. Thus, service coverage is maintained even if the home coverage area 102 is providing unsatisfactory service coverage.

As shown in FIG. 1, a 5G RAN is split into DUs (e.g., DU 108) that manage scheduling of all the users and a CU that manages the mobility and radio resource control (RRC) state for all the UEs. The RRC is a layer within the 5G NR protocol stack. It exists only in the control plane, in the UE and in the gNB. The behavior and functions of RRC are governed by the current state of RRC. In 5G NR, RRC has three distinct states: RRC_IDLE, RRC_CONNECTED and RRC_INACTIVE.

Figure 2:
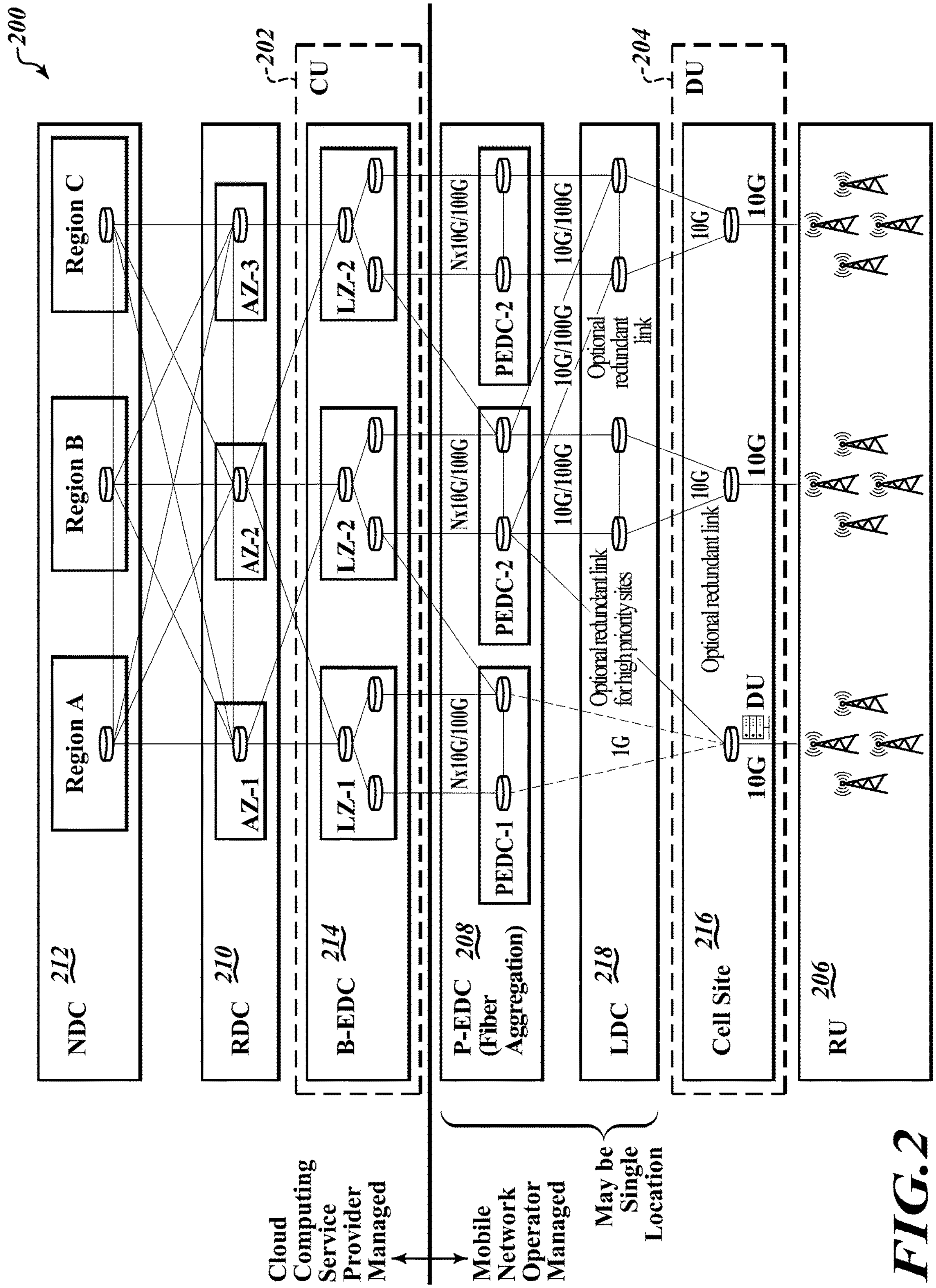
FIG. 2 illustrates a diagram of an example system architecture overview of a system in which the environment of FIG. 1 may be implemented in accordance with embodiments described herein.

FIG. 2 illustrates a diagram of an example system architecture overview of a system 200 in which the environment of FIG. 1 may be implemented in accordance with embodiments described herein. As shown in FIG. 2, the radio unit (RU) 206 converts radio signals sent to and from the antenna into a digital signal for transmission over packet networks. It handles the digital front end (DFE) and the lower physical (PHY) layer, as well as the digital beamforming functionality.

The DU 204 may sit close to the RU 206 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried. This logical node includes a subset of the gNB functions, depending on the functional split option, and its operation is controlled by the CU 202.

The CU 202 is the centralized unit that runs the RRC and Packet Data Convergence Protocol (PDCP) layers. A gNB may comprise a CU and one DU connected to the CU via Fs-C and Fs-U interfaces for control plane (CP) and user plane (UP), respectively. A CU with multiple DUs will support multiple gNBs. The split architecture enables a 5G network to utilize different distribution of protocol stacks between CU 202 and DU 204 depending on mid-haul availability and network design. The CU 202 is a logical node that includes the gNB functions like transfer of user data, mobility control, RAN sharing, positioning, session management, etc., with the exception of functions that may be allocated exclusively to the DU 204. The CU 202 controls the operation of several DUs 204 over the mid-haul interface.

As mentioned above, 5G network functionality is split into two functional units: the DU 204, responsible for real time 5G layer 1 (L1) and 5G layer 2 (L2) scheduling functions, and the CU 202 responsible for non-real time, higher L2 and 5G layer 3 (L3). As shown in FIG. 2, the DU's server and relevant software may be hosted on a cell site 216 itself or can be hosted in an edge cloud (local data center (LDC) 218 or central office) depending on transport availability and fronthaul interface. The CU's server and relevant software may be hosted in a regional cloud data center or as shown in FIG. 2, in a breakout edge data center (B-EDC) 214. As shown in FIG. 2, the DU 204 may be provisioned to communicate via a pass-through edge data center (P-EDC) 208. The P-EDC 208 may provide a direct circuit fiber connection from the DU directly to the primary cloud availability zone (e.g., B-EDC 214) hosting the CU 202. In some embodiments, the LDC 218 and P-EDC 208 may be co-located or in a single location. The CU 202 may be connected to a regional cloud data center (RDC) 210, which in turn may be connected to a national cloud data center (NDC) 212. In the example embodiment, the P-EDC 208, the LDC 218, the cell site 216 and the RU 206 may all be managed by the mobile network operator and the B-EDC 214, the RDC 210 and the NDC 212 may all be managed by a cloud computing service provider. According to various embodiments, the actual split between DU and RU may be different depending on the specific use-case and implementation.

Figure 3:
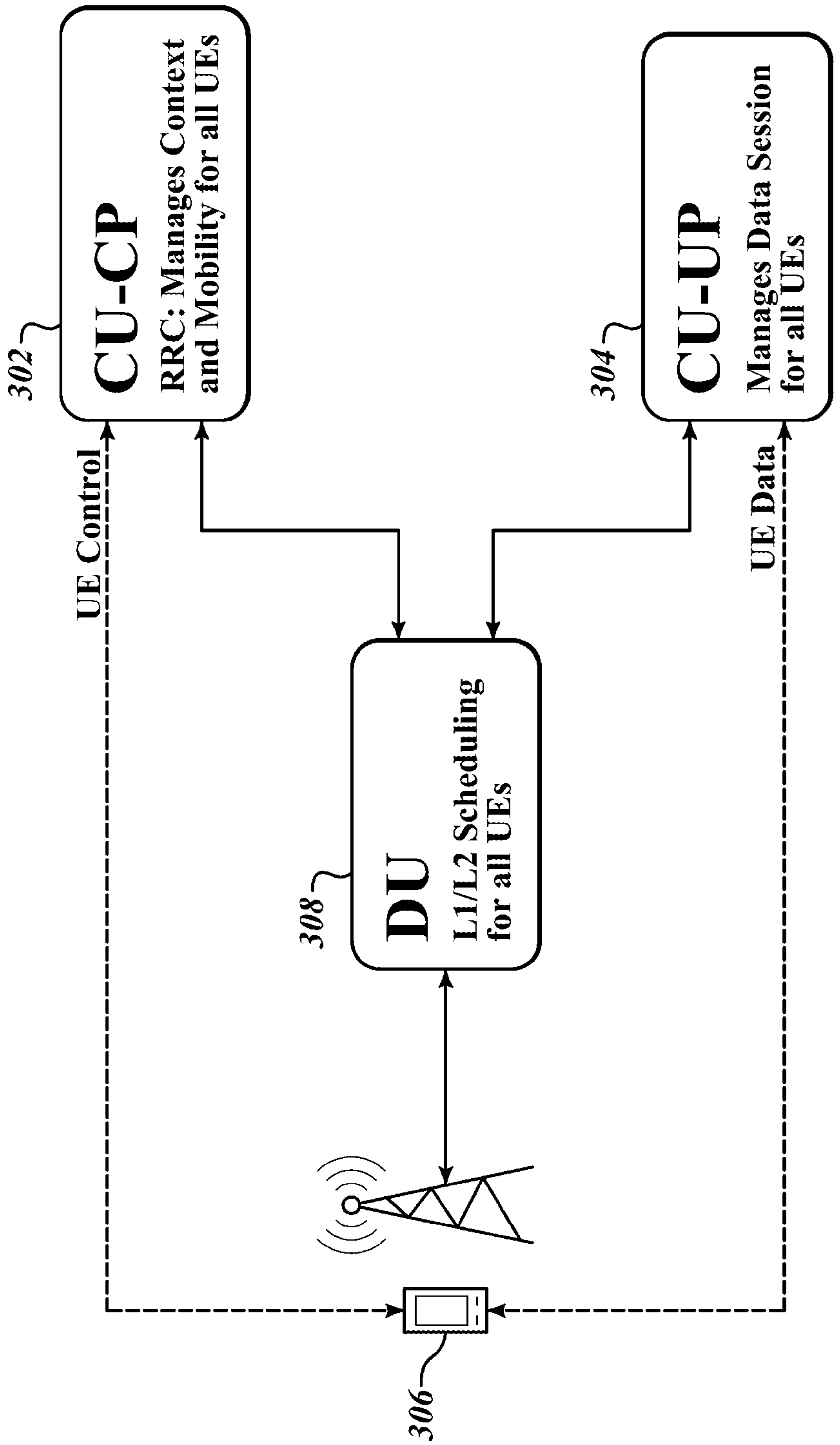
FIG. 3 illustrates a diagram showing connectivity between certain telecommunication network components during cellular telecommunication.

FIG. 3 is a diagram showing connectivity between certain telecommunication network components (e.g., CU 202 and DU 204 of FIG. 2) during cellular telecommunication in accordance with embodiments described herein. Referring still to FIG. 3, the central unit control plane (CU-CP) 302, (e.g., CU 202 of FIG. 2), primarily manages control processing of DUs, such as DU 308 (e.g., DU 204 of FIG. 2), and UEs, such as UE 306. The CU-CP 302 hosts RRC and the control-plane part of the PDCP protocol. CU-CP 302 manages the mobility and radio resource control (RRC) state for all the UEs. The RRC is a layer within the 5G NR protocol stack and manages context and mobility for all UEs. The behavior and functions of RRC are governed by the current state of RRC. In 5G NR, RRC has three distinct states: RRC_IDLE, RRC_CONNECTED and RRC_INACTIVE. The CU-CP 302 terminates the E1 interface connected with the central unit user plane (CU-UP) 304 and the F1-C interface connected with the DU 308. The DU 308 maintains a constant heartbeat with CU 302. The CU-UP 304 manages the data sessions for all UEs 306 and hosts the user plane part of the PDCP protocol. The CU-UP 304 terminates the E1 interface connected with the CU-CP and the F1-U interface connected with the DU 308.

A virtual private cloud is a configurable pool of shared resources allocated within a public cloud environment. The VPC provides isolation between one VPC user and all other users of the same cloud, for example, by allocation of a private IP subnet and a virtual communication construct (e.g., a VLAN or a set of encrypted communication channels) per user. In some embodiments, this 5G network leverages the distributed nature of 5G cloud-native network functions and cloud flexibility, which optimizes the placement of 5G network functions for optimal performance based on latency, throughput and processing requirements.

In some embodiments, the network architecture utilizes a logical hierarchical architecture consisting of National Data Centers (NDCs), Regional Data Centers (RDCs) and Breakout Edge Data Centers (BEDCs), to accommodate the distributed nature of 5G functions and the varying requirements for service layer integration. In one or more embodiments, BEDCs are deployed in Local Zones hosting 5G NFs that have strict latency budgets. They may also be connected with Pass-through Edge Data Centers (PEDC), which serve as an aggregation point for all Local Data Centers (LDCs) and cell sites in a particular market. BEDCs also provide Internet peering for 5G data service.

In one or more embodiments, an O-RAN network may be implemented that includes an RU (Radio Unit), which is deployed on towers and a DU (Distributed Unit), which controls the RU. These units interface with the Centralized Unit (CU), which is hosted in the BEDC at the Local Zone. These combined pieces provide a full RAN solution that handles all radio level control and subscriber data traffic. In some embodiments, the User Plane Function (Data Network Name (DNN)) is collocated in the BEDC, which anchors user data sessions and routes to the Internet. In another aspect, the BEDCs leverage local Internet access available in Local Zones, which allows for a better user experience while optimizing network traffic utilization.

In one of more embodiments, the Regional Data Centers (RDCs) are hosted in the Region across multiple availability zones. The RDCs host 5G subscribers' signaling processes such as authentication and session management as well as voice for 5G subscribers. These workloads can operate with relatively high latencies, which allows for a centralized deployment throughout a region, resulting in cost efficiency and resiliency. For high availability, multiple RDCs are deployed in a region, each in a separate Availability Zone (AZ) to ensure application resiliency and high availability.

In another aspect of some embodiments, an AZ is one or more discrete data centers with redundant power, networking, and connectivity in a Region. In some embodiments, AZs in a Region are interconnected with high-bandwidth and low-latency networking over a fully redundant, dedicated metro fiber, which provides high-throughput, low-latency networking between AZs. Cloud Native Functions (CNFs) deployed in the RDC utilize a high speed backbone to failover between AZs for application resiliency. CNFs like AMF and SMF, which are deployed in RDC, continue to be accessible from the BEDC in the Local Zone in case of an AZ failure. They serve as the backup CNF in the neighboring AZ and would take over and service the requests from the BEDC.

In this embodiment of the system for persistent roaming to mitigate problematic home network coverage areas, dedicated VPCs are implemented for each Data Center type (e.g., local data center, breakout edge data center, regional data center, national data center, and the like). In some such embodiments, the national data center VPC stretches across multiple Availability Zones (AZs). In another aspect of some embodiments, two or more AZs are implemented per region of the cloud computing service provider. Some embodiments of the 5G Core network functions require support for advanced routing capabilities inside VPC and across VPCs (e.g., UPF, SMF and ePDG). These functions rely on routing protocols such as BGP for route exchange and fast failover (both stateful and stateless). To support these requirements, virtual routers are deployed on EC2 to provide connectivity within and across VPCs, as well as back to the on-prem network.

Figure 4:
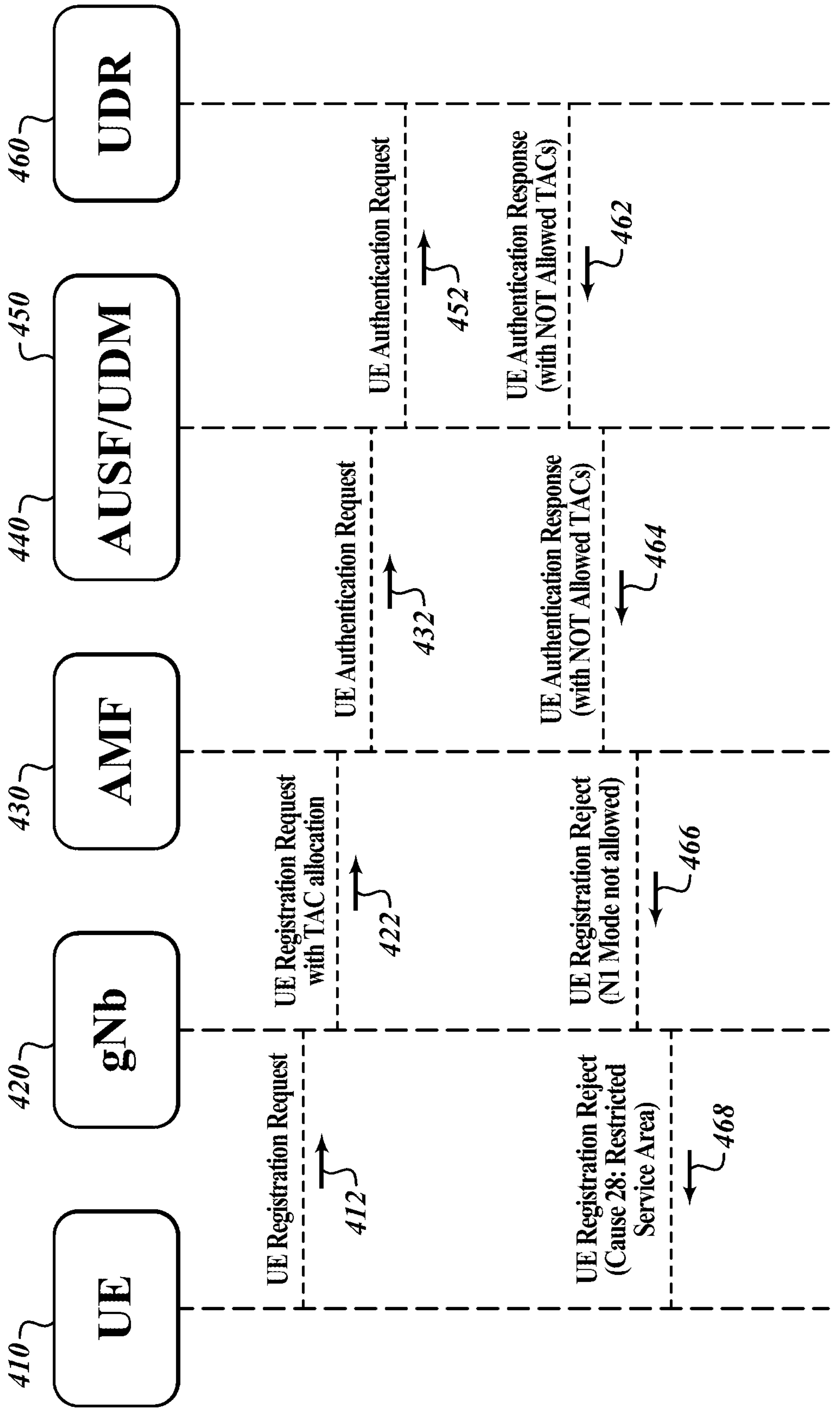
FIG. 4 illustrates a communication flow within a system for persistent roaming to mitigate problematic home network coverage areas.

Similarly to FIG. 3, FIG. 4 also refers to the connectivity between certain telecommunication network components during cellular telecommunication. While FIG. 3 referred to network components CU-CP 302, CU-UP 304, UE 306 and DU 308, FIG. 4 illustrates a system for persistent roaming to mitigate problematic home network coverage areas that includes network components User Equipment (UE) 410, a Next Generation Node B (gNb) 420, an Access and Mobility Management Function (AMF) 430, an Authentication Server Function (AUSF) 440/Unified Data Management (UDM) 450, and a Unified Data Repository (UDR) 460. In some embodiments, the User Equipment (UE) 410 is similar to the UE 306 and the UE 106. The Access and Mobility Management Function (AMF) is one of the control plane network functions (NF) of the 5G core network, along with the AUSF 440/UDM 450 and the UDR 460. The Authentication Server Function 440 is configured for UE 410 authentication. The Unified Data Management 450 function is configured for managing subscriber-related network procedures like registration, authorization and mobility management. The Unified Data Repository 460 is a database that stores the data for the subscriber-related network procedures like registration, authorization and mobility management. Together, the UDM 450 and the UDR 460 collaborate to conduct data management responsibilities.

Figure 5:
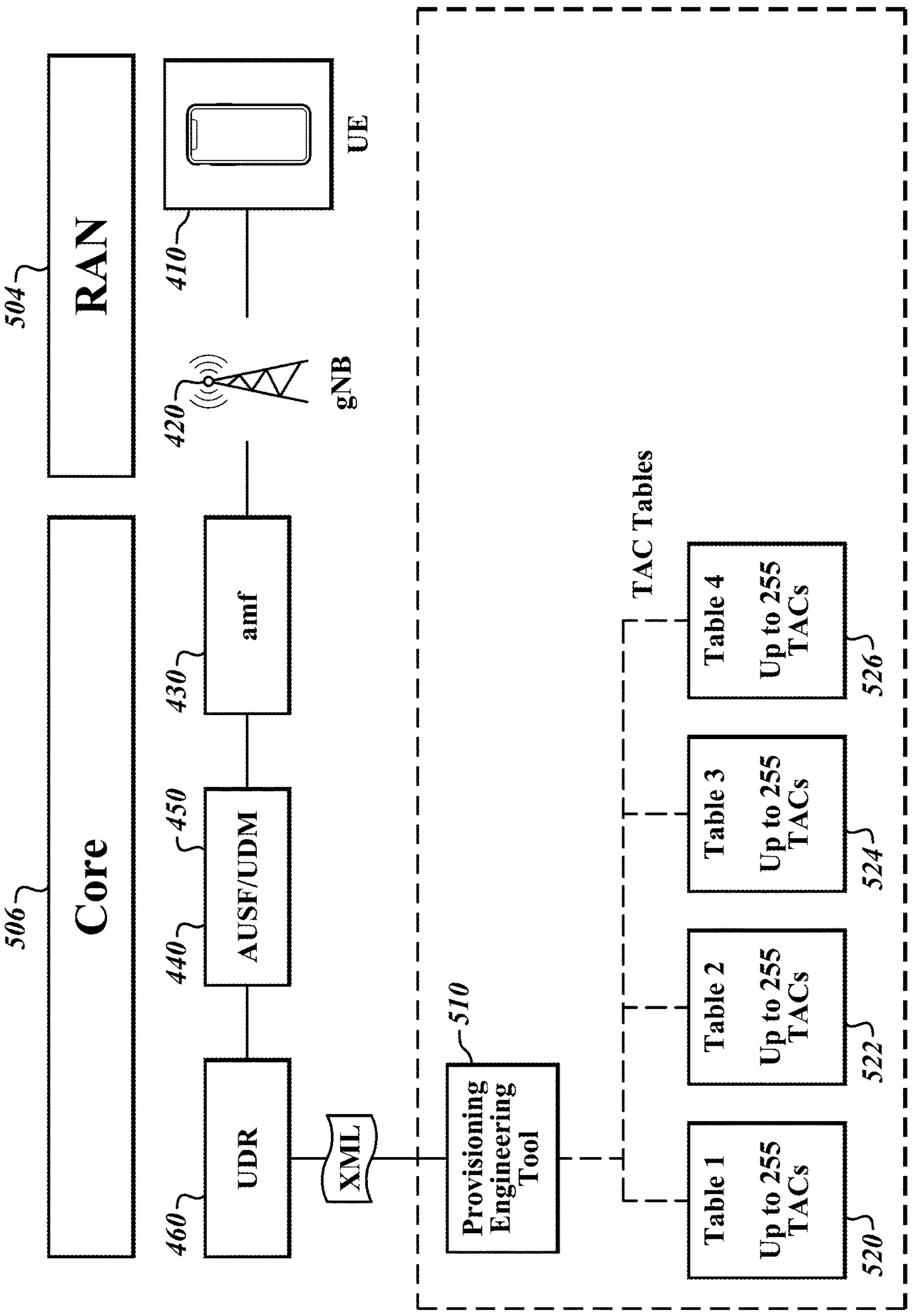
FIG. 5 illustrates a context diagram of a system for persistent roaming to mitigate problematic home network coverage areas that shows a Provisioning Engineering Tool.

In one or more embodiments, the system for persistent roaming to mitigate problematic home network coverage areas ensures consistent service quality and seamless transition between cell site clusters and markets for subscribers restricting subscriber access to voice and data services in problematic home network coverage areas. Once the subscriber access is restricted from its home MNO network, UE 410 associated with the restricted subscriber starts roaming on third-party MNO networks. In some such embodiments, Tracking Area Code (TAC) restriction tables are used to restrict the use of a cell site by a subscriber. This is accomplished by updating the provisioning profile on the UDR 460 using a Provisioning Engineering Tool 510 (as shown in FIG. 5) to create the TAC restriction tables 520, 522, 524, 526 in the provisioning profile (as shown in FIG. 5) that restrict access to service by the UE 410 associated with a user account in a geographical area. A provisioning profile defines the user connectivity in a MNO network. A Tracking Area Code (TAC) is a hexadecimal identifier that is assigned to a group of sites in a designated service market.

Referring again to FIG. 4, in some embodiments of the system for persistent roaming to mitigate problematic coverage areas, the UE 410 sends a UE registration request 412 to the gNb 420. The gNb 420 in turn sends a UE registration request 422 with TAC allocation to the AMF 430. Next, the AMF 430 sends a UE authentication, UE Context Management registration, and get subscription data request 432 to the to AUSF 440/UDM 450. This, in turn, results in the UDM 450 sending a UE credential and subscription data query request 452 to the UDR 460. After the UDR 460 responded the request 452 with the required information including the UE credential, subscription information with the TACs that are not allowed in response 462, AUSF 440/UDM 450 processes the UE authentication and sends the response 464 to the AMF 430 that includes UE authentication information and subscription data with TACs that are not allowed. The AMF 430 in turn processes the information and sends a UE registration rejection 466 to the gNb 420 which states that the UE requests service in a tracking area of non-allowed areas. Finally, the gNb 420 sends a UE 410 registration rejection 468 to the UE 410 which states Cause #28: Restricted Service Area. In one or more embodiments, this registration rejection of the mobile device associated with the user account is not achieved by altering SIM status.

Referring now to FIG. 5, one or more embodiments of a mobile network architecture are shown that include a system for persistent roaming to mitigate problematic home network coverage areas. As shown in FIG. 5, the UEs 410 and the gNb 420 are part of the Radio Access Network (RAN) 504. As described above, the gNb 420 connects to the AMF 430. The AMF 430, AUSF 440/UDM 450, and UDR 460 are part of the Core network 506. The UDR 460 in turn connects to the Provisioning Engineering Tool 510. The Provisioning Engineering Tool 510 creates the TAC restriction tables 520, 522, 524, 526 and is used for managing UE provisioning and the association between devices to TAC restriction tables. The TAC restriction tables 520, 522, 524, 526 designate which TACs should be restricted for each UE 410. In some embodiments, each TAC restriction table includes up to 255 TACs. In other embodiments, the TAC restriction table may include a larger number of TACs.

In FIG. 5, TAC Blocking is implemented in which UEs 410 are restricted from the mobile network operator network using Tracking Area Codes. Tracking Area Code (TAC) is a component in mobile network management in which network access is managed to ensure security within a geographical area. In this manner, TAC Blocking uses Tracking Area Codes to restricted UEs 410 from the mobile network operator network. TAC restriction tables 520, 522, 524, 526 are used to group TACs and are used to manage market launches by TACs. In this manner, when a mobile network market is just launching and there are problematic home network coverage areas, TACs may be used to direct users of the mobile network market to a roaming partner instead of the new network operator network that still has noticeable coverage problems, by rejecting their registration attempt to the mobile network market. This preempts complaints from unsatisfied customers. In some embodiments, this registration rejection and redirecting to the roaming partner is performed without the knowledge of the users of the mobile network market.

Figure 6:
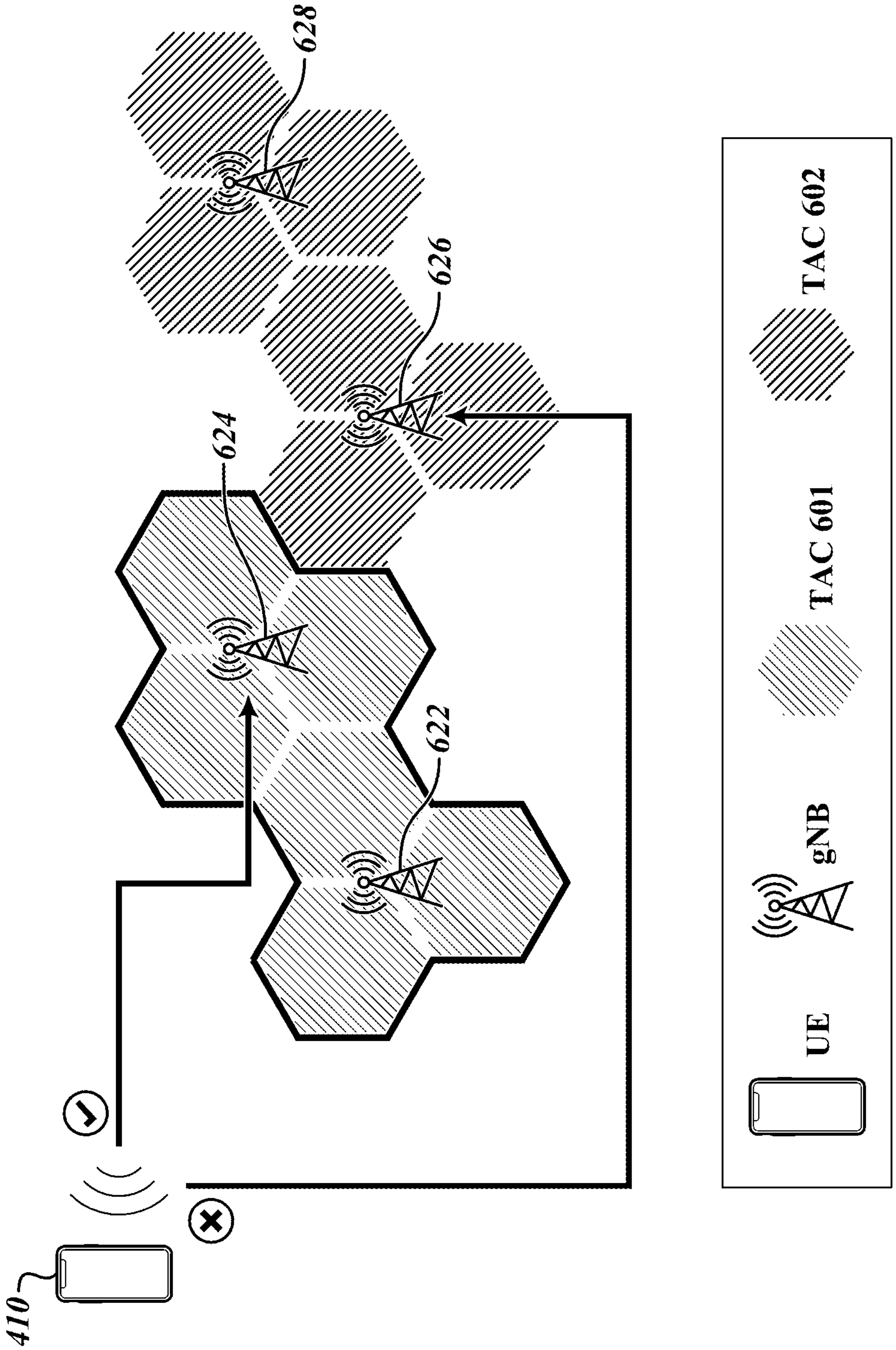
FIG. 6 illustrates a context diagram of a system for persistent roaming to mitigate problematic home network coverage areas that shows TAC-based registration rejection.

Referring now to FIG. 6, one or more embodiments of a mobile network architecture are shown that include a system for persistent roaming to mitigate problematic home network coverage areas that is initiating registration rejection for all known users based on TACs. FIG. 6 shows a UE 410 in attempted communication with multiple gNBs 622, 624, 626, 628. Specifically, two of the multiple gNBs 622, 624 are in TAC 601, and two of the multiple gNBs 626, 628 are in TAC 602. TAC 601 is a group of cell sites in which gNBs 622, 624 are located where registration with the user of UE 410 is allowed. TAC 602 is a group of cell sites in which gNBs 626, 628 are located where registration with the user of UE 410 is rejected. A TAC Restriction List is defined at UDR 460. Notably, the TAC Restriction List is a list of tracking areas (i.e., a group of cell sites) where specific users are prohibited from accessing these cell sites. In the scenario shown in FIG. 6, the user of UE 410 has its registration rejected in the tracking areas of TAC 602, which includes gNBs 626, 628, while the user of UE 410 has its registration accepted in the tracking areas of TAC 601, which includes gNBs 622, 624.

Once the UE 410 has its registration rejected in the tracking areas of TAC 602, it is then directed by the system to a roaming partner for cellular mobile service. Thus, when a cellular mobile device (e.g., 410) knows that its coverage is poor, spotty, or otherwise problematic in a certain region due to the region being new (or it simply being a challenging coverage area due to geography or other factors), the TAC Restriction List is used to automatically direct certain listed users to roaming partners. This directing (or even forcing) of certain listed users to roaming partners is performed from the very beginning of those users attempting service (i.e., registration) in that tracking area so that they have acceptable service coverage from the beginning of their attempt for service in that tracking area. Otherwise stated, there is no period of unsatisfactory service coverage that is required to be endured before the certain listed users are directed from the home coverage area to roaming partner.

Figure 7:
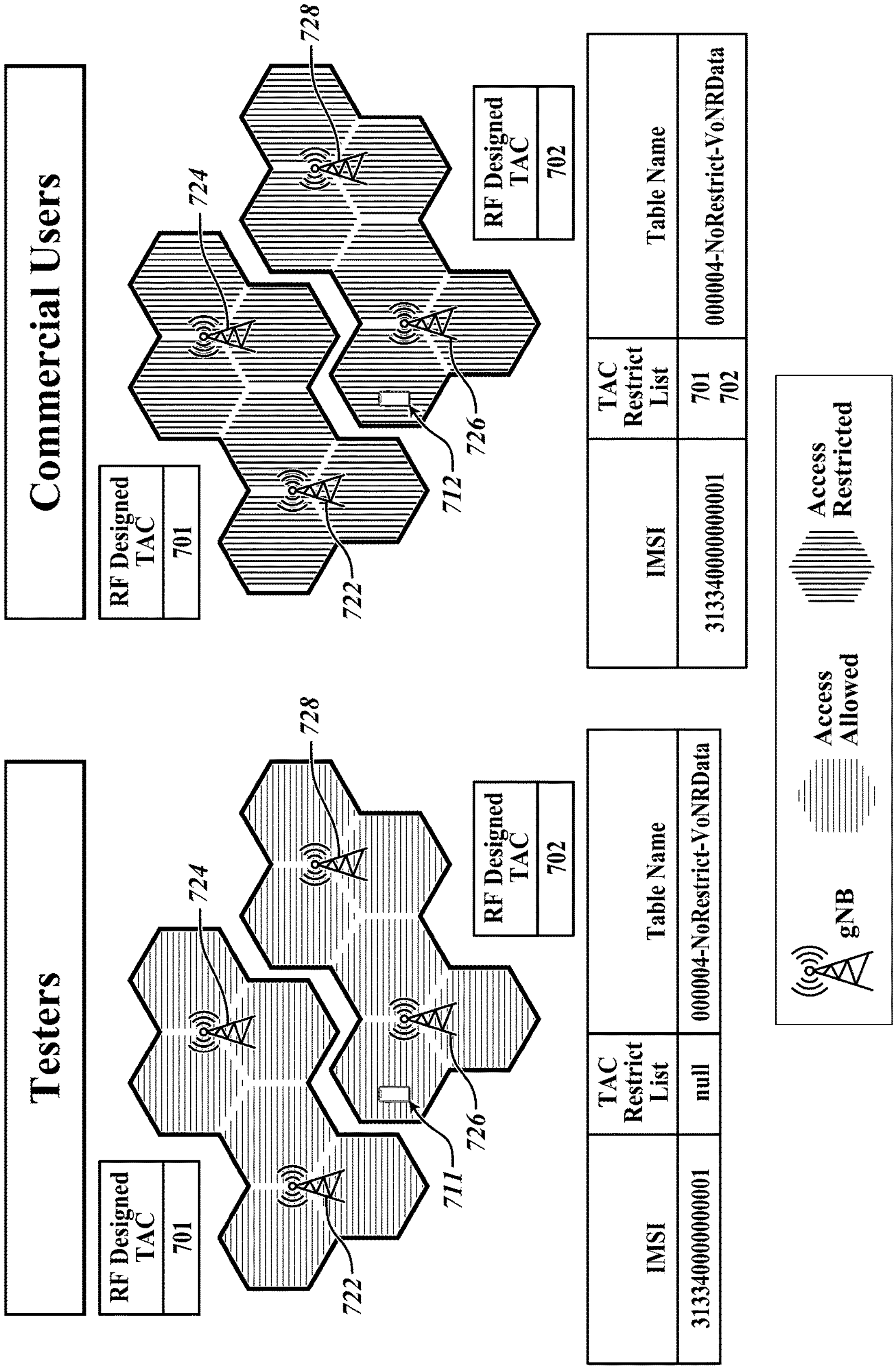
FIG. 7 illustrates a context diagram of a system for persistent roaming to mitigate problematic home network coverage areas that shows a use case of mobile network testers in a new service area.

Referring now to FIG. 7, a use case is shown for one embodiment of a mobile network architecture that includes a system for persistent roaming to mitigate problematic home network coverage areas in a testing region where commercial use is restricted but test use is allowed. Thus, FIG. 7 presents a scenario in which mobile carrier testers (with mobile devices UE 711) are allowed to register and have service in both TAC 701 and TAC 702, but commercial mobile users (with mobile devices UE 712) are not allowed to register (i.e., registration is rejected) and have their service rejected in both TAC 701 and TAC 702. In this embodiment, TAC 701 includes gNBs 722, 724 and their associated tracking areas (i.e., a group of cell sites), while TAC 702 includes gNBs 726, 728 and their associated tracking areas (i.e., a group of cell sites).

Unlike the scenario shown in FIG. 6 where all known users (with mobile devices UE 410) had their registration allowed in TAC 601 but had their registration rejected in TAC 602, in FIG. 7 all mobile carrier testers (with mobile devices UE 711) had their registration allowed in both TAC 701 and TAC 702, and all commercial mobile users (with mobile devices UE 712) had their registration rejected in both TAC 701 and TAC 702. Accordingly, all the commercial mobile users (with mobile devices UE 712) are forced to use a roaming partner (without their knowledge in some embodiments) so that the commercial mobile users believe they are receiving satisfactory service coverage from their home mobile service provider.

This may be accomplished since the TAC Restriction List is a list of tracking areas (i.e., a group of cell sites) where only specific users are prohibited from access to these cell sites, while other specific users may be allowed to obtain registration and thus access to these cell sites. This use case may be seen in an embodiment where a service market is not yet ready for commercial service in this service area, but mobile carrier testers still need to have access to this service access so that they can perform the testing needed to bring the service area up to satisfactory service standards. Therefore, in such service areas, commercial users service access is restricted using the TAC Restriction List of the system for persistent roaming to mitigate problematic home network coverage areas, while the system simultaneously allows mobile carrier testers to have registration and thus access to these service areas.

Figure 8:
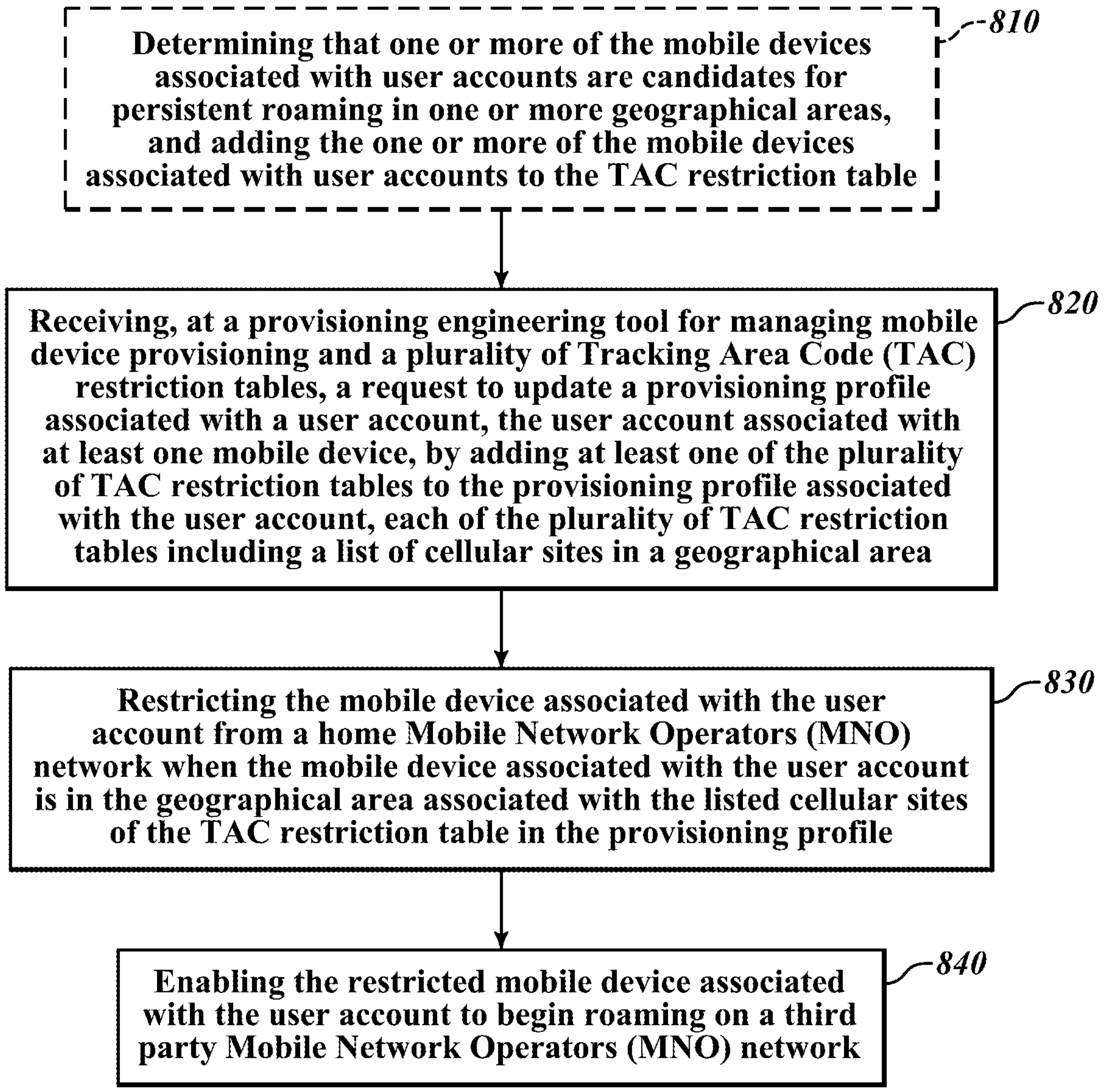
FIG. 8 is a logic diagram showing number sequencing data flow between certain telecommunication network components during persistent roaming to mitigate problematic home network coverage areas.

FIG. 8 is a logic diagram showing a system for persistent roaming to mitigate problematic home network coverage areas. As shown in FIG. 8, at optional operation 810, one or more of the mobile devices 410 associated with user accounts are determined are candidates for persistent roaming in one or more geographical areas, and those one or more of the mobile devices 410 associated with user accounts are added to the TAC restriction table 520. At operation 820, at a provisioning engineering tool for managing mobile device provisioning and a plurality of Tracking Area Code (TAC) restriction tables 520, a request is received to update a provisioning profile associated with a user account, the user account associated with at least one mobile device, by adding at least one of the plurality of TAC restriction tables to the provisioning profile associated with the user account, each of the plurality of TAC restriction tables including a list of cellular sites in a geographical area. At operation 830, the at least one mobile device 410 associated with the user account is restricted from a home Mobile Network Operators (MNO) network when the at least one mobile device associated with the user account is in the geographical area associated with the listed cellular sites of the at least one TAC restriction table 520 in the provisioning profile. At operation 840, the restricted at least one mobile device 410 associated with the user account is enabled to begin roaming on a third party Mobile Network Operators (MNO) network.

In some embodiments, end user mobile devices have experienced dropped calls or other network problems such as poor service. In some embodiments, the disclosed system consolidates user data (or tester data) regarding dropped calls of end user mobile devices and other network problems. This user data (or tester data) may include data logs, as well as service calls, user/tester complaints, or other data that has been generated or obtained by the carrier network. In some embodiments, this user/tester data will be collected over as long a period of time as possible. In other embodiments, such as when a recent network upgrade has occurred, the user/tester data may be collected and consolidated from the time and date of the upgrade to present.

Referring now to other aspects of the system for persistent roaming to mitigate problematic home network coverage areas, in some embodiments, this consolidated user data is then used as training data to train a machine learning model regarding dropped calls of the end user mobile devices and/or other network problems experienced by the end user. Next, the machine learning model analyzes the user data to determine geographical areas in which repetitive dropped calls of the end user mobile devices and/or other network problems experienced by the end user have been identified. This analysis of the training data by the machine learning model is then able to predict, as an output from the machine learning model, future dropped calls of the end user mobile devices and/or other network problems experienced by the end user in identified geographical areas.

These identified geographical areas may be referred to predicted call drop zones in the home network coverage area. While these regions are referred to as predicted call drop zones, these regions may also include, or alternatively include, other identified network problems experienced by the end user, such as poor voice quality or data transfer without actual resulting in a dropped call. In some embodiments, the alternate carrier is a roaming partner that is used when an end user travels with its mobile device outside of its contracted coverage area. In one or more embodiments of the system and method for persistent roaming, the system determines that the end user mobile device is approaching a predicted call drop zone using Global Positioning System (GPS), local positioning systems, or other inertial positioning systems. Such other inertial positioning systems include, by way of example only, and not by way of limitation: sensors such as cameras, LiDAR, radar, radios, and star trackers.

Notably, some carrier networks will know where the outer edges of their coverage area exist and may take some type of measure to address coverage at the known edges of their coverage area. In contrast, the system and method for persistent roaming to mitigate problematic home network coverage areas described herein provides a technological improvement and solution to a technological problem by addressing problematic repetitive call drop areas and poor network experience areas that are within the geographical areas of the network carrier coverage and at least partially away from edges of the network carrier coverage. Thus, in some embodiments, the system and method for persistent roaming identifies and predicts future dropped calls of the end user mobile devices and network problems in identified geographical areas that would be unknown without the persistent roaming by the machine learning model.

Embodiments of the system and method for persistent roaming have been described above that implement a machine learning model. While many embodiments of the system and method for persistent roaming implement a machine learning model, other embodiments of the system and method for persistent roaming do not employ a machine learning model, but rather utilize more traditional analysis (i.e., non-machine learning). They may be several technical reasons to implement traditional, non-machine learning, analysis, including by way of example only, and not by way of limitation: lack of sufficient computation power available, an insufficient amount of data to properly train a machine learning model, lack of authorization to use the data in a machine learning model (e.g., potentially due to contractual or privacy issues), or the like. Thus, the predicted call drop zones may be identified using other types of analysis (i.e., non-machine learning) of the user data in one or more embodiments of the system and method for persistent roaming to mitigate problematic home network coverage areas.

In some embodiments of a system for persistent roaming to mitigate problematic home network coverage areas, each individual end user mobile device is associated with its corresponding 5G Core using an IMSI (International Mobile Subscriber Identifier) number. An IMSI is a unique number associated with Global System for Mobile Communications (GSM) and Universal Mobile Telecommunications System (UMTS) network mobile phone users. As such, the IMSI is a unique number that identifies a mobile end user that is a subscriber to the carrier network.

Figure 9:
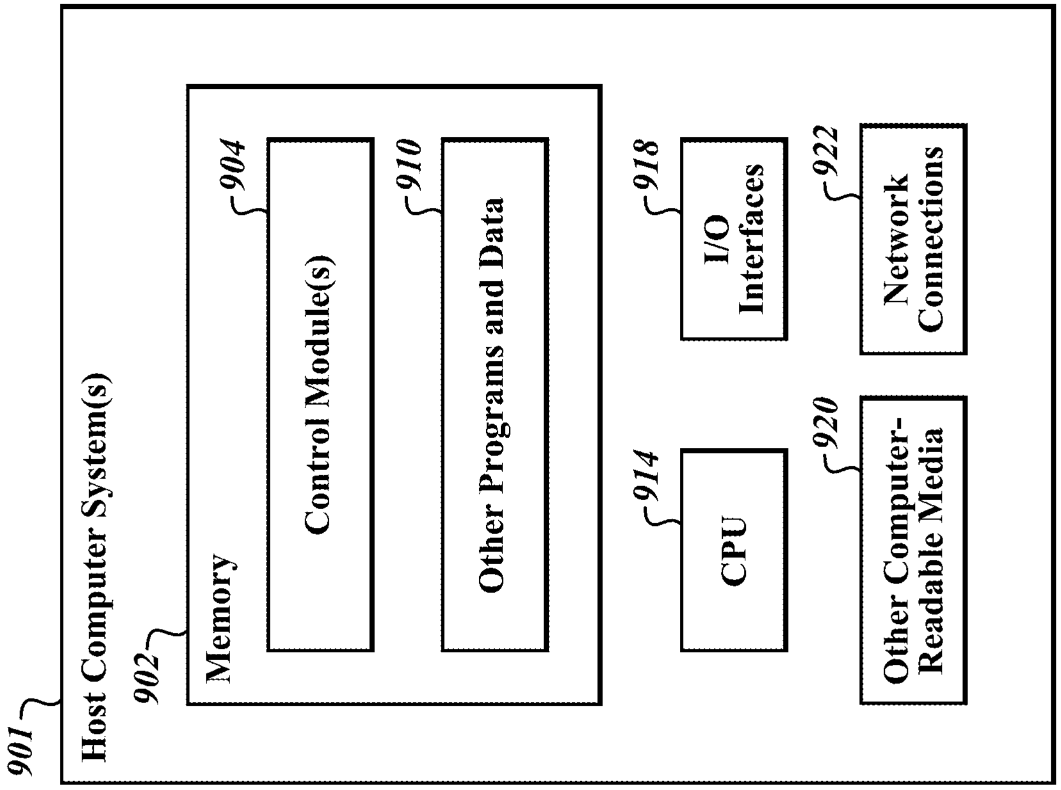
FIG. 9 shows a system diagram that describes an example implementation of a computing system(s) for implementing embodiments described herein.

FIG. 9 shows a system diagram that describes an example implementation of a computing system(s) for implementing embodiments described herein. The functionality described herein for a system for persistent roaming to mitigate problematic home network coverage areas, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility.

In particular, shown is example host computer system(s) 901. For example, such computer system(s) 901 may represent those in various data centers and cell sites shown and/or described herein that host the functions, components, microservices and other aspects described herein to implement a system for persistent roaming to mitigate problematic home network coverage areas. In some embodiments, one or more special-purpose computing systems may be used to implement the functionality described herein. Accordingly, various embodiments described herein may be implemented in software, hardware, firmware, or in some combination thereof. Host computer system(s) 901 may include memory 902, one or more central processing units (CPUs) 914, I/O interfaces 918, other computer-readable media 920, and network connections 922.

Memory 902 may include one or more various types of non-volatile and/or volatile storage technologies. Examples of memory 902 may include, but are not limited to, flash memory, hard disk drives, optical drives, solid-state drives, various types of random-access memory (RAM), various types of read-only memory (ROM), other computer-readable storage media (also referred to as processor-readable storage media), or the like, or any combination thereof. Memory 902 may be utilized to store information, including computer-readable instructions that are utilized by CPU 914 to perform actions, including those of embodiments described herein.

Memory 902 may have stored thereon control module(s) 904. The control module(s) 904 may be configured to implement and/or perform some or all of the functions of the systems, components and modules described herein for a system for persistent roaming to mitigate problematic home network coverage areas. Memory 902 may also store other programs and data 910, which may include rules, databases, application programming interfaces (APIs), software platforms, cloud computing service software, network management software, network orchestrator software, network functions (NF), AI or ML programs or models to perform the functionality described herein, user interfaces, operating systems, other network management functions, other NFs, etc.

Network connections 922 are configured to communicate with other computing devices to facilitate the functionality described herein. In various embodiments, the network connections 922 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 918 may include a video interface, other data input or output interfaces, or the like. Other computer-readable media 920 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for instantiating persistent roaming for a mobile device, the method comprising:

receiving, at a provisioning engineering tool for managing mobile device provisioning and a plurality of Tracking Area Code (TAC) restriction tables, a request to update a provisioning profile associated with a user account, the user account associated with at least one mobile device, by adding at least one of the plurality of TAC restriction tables to the provisioning profile associated with the user account, each of the plurality of TAC restriction tables including a list of cellular sites in a geographical area;

restricting the at least one mobile device associated with the user account from a home Mobile Network Operators (MNO) network when the at least one mobile device associated with the user account is in the geographical area associated with the listed cellular sites of the at least one TAC restriction table in the provisioning profile;

causing a Unified Data Repository (UDR) to force the at least one mobile device associated with the user account to attempt a registration process that launches the updated provisioning profile with the TAC restriction table; and enabling the restricted at least one mobile device associated with the user account to begin roaming on a third party Mobile Network Operators (MNO) network.

2. The method of claim 1, further comprising:

determining that one or more of the at least one mobile devices associated with user accounts are candidates for persistent roaming in one or more geographical areas, and adding the one or more of the at least one mobile devices associated with user accounts to the TAC restriction table.

3. The method of claim 1, wherein the restricting of the at least one mobile device associated with the user account from the home MNO network further comprises: sending a payload of data to the Unified Data Repository (UDR) to force the at least one mobile device associated with the user account to attempt a registration process that launches the updated provisioning profile with the TAC restriction table.

4. The method of claim 3, wherein the restricting of the at least one mobile device associated with the user account from the home MNO network further comprises: forcing the at least one mobile device associated with the user account, via the Unified Data Repository (UDR), to attempt a registration process further comprises losing Network Registration.

5. The method of claim 1, wherein the provisioning engineering tool includes multiple TAC restriction tables and each TAC restriction table contains up to 255 Tracking Area Codes.

6. The method of claim 1, wherein the TAC restriction table individually identifies a user by International Mobile Subscriber Identifier (IMSI).

7. The method of claim 1, further comprising: enabling the user to be queried to determine their current connectivity state.

8. The method of claim 1, wherein a prohibited services include one or more of voice and data services.

9. The method of claim 1, wherein the restricting of the at least one mobile device associated with the user account from the home Mobile Network Operators (MNO) network further comprises rejecting a registration attempt of the at least one mobile device associated with the user account.

10. A system for instantiating persistent roaming for a mobile device, the system comprising:

a memory that stores computer-executable instructions; and a processor that executes the computer-executable instructions that cause the processor to:

receiving, at a provisioning engineering tool for managing mobile device provisioning and a plurality of Tracking Area Code (TAC) restriction tables, a request to update a provisioning profile associated with a user account, the user account associated with at least one mobile device, by adding at least one of the plurality of TAC restriction tables to the provisioning profile associated with the user account, each of the plurality of TAC restriction tables including a list of cellular sites in a geographical area;

restrict the at least one mobile device associated with the user account from a home Mobile Network Operators (MNO) network when the at least one mobile device associated with the user account is in the geographical area associated with the listed cellular sites of the TAC restriction table in the provisioning profile;

cause a Unified Data Repository (UDR) to force the at least one mobile device associated with the user account to attempt a registration process that launches the updated provisioning profile with the TAC restriction table; and enable the restricted at least one mobile device associated with the user account to begin roaming on a third party Mobile Network Operators (MNO) network.

11. The system of claim 10, wherein the system determines that one or more of the at least one mobile devices associated with user accounts are candidates for persistent roaming in one or more geographical areas, and adds the one or more of the at least one mobile devices associated with user accounts to the TAC restriction table.

12. The system of claim 10, wherein the restricting of the at least one mobile device associated with the user account from the home MNO network further includes a payload of data being sent to the Unified Data Repository (UDR) to force the at least one mobile device associated with the user account to attempt a registration process that launches the updated provisioning profile with the TAC restriction table.

13. The system of claim 10, wherein the restricting of the at least one mobile device associated with the user account from the home MNO network further includes the at least one mobile device associated with the user account being forced, via the Unified Data Repository (UDR), to attempt a registration process further comprises losing Network Registration.

14. The system of claim 10, wherein the provisioning engineering tool includes multiple TAC restriction tables and each TAC restriction table contains up to 255 Tracking Area Codes.

15. The system of claim 10, wherein the TAC restriction table individually identifies a user by International Mobile Subscriber Identifier (IMSI).

16. The system of claim 10, wherein the system enables the user to be queried to determine their current connectivity state.

17. The system of claim 10, wherein a prohibited services include one or more of voice and data services.

18. The system of claim 10, wherein the restricting of the at least one mobile device associated with the user account from the home Mobile Network Operators (MNO) network further comprises rejecting a registration attempt of the at least one mobile device associated with the user account.

19. A non-transitory computer-readable storage medium having computer-executable instructions stored thereon that, when executed by a processor, cause the processor to:

receiving, at a provisioning engineering tool for managing mobile device provisioning and a plurality of Tracking Area Code (TAC) restriction tables, a request to update a provisioning profile associated with a user account, the user account associated with at least one mobile device, by adding at least one of the plurality of TAC restriction tables to the provisioning profile associated with the user account, each of the plurality of TAC restriction tables including a list of cellular sites in a geographical area;

cause a Unified Data Repository (UDR) to force the at least one mobile device associated with the user account to attempt a registration process that launches the updated provisioning profile with the TAC restriction table; and restrict the mobile device associated with the user account from a home Mobile Network Operators (MNO) network when the at least one mobile device associated with the user account is in the geographical area associated with the listed cellular sites of the TAC restriction table in the provisioning profile.

20. The non-transitory computer-readable storage medium of claim 19, wherein computer-executable instructions stored thereon that, when executed by a processor, cause the processor to: enable the restricted at least one mobile device associated with the user account to begin roaming on a third party Mobile Network Operators (MNO) network.

* * * * *